(12) United States Patent
Peng et al.

(10) Patent No.: US 12,516,798 B2
(45) Date of Patent: Jan. 6, 2026

(54) LIGHTING CONTROL METHOD AND SYSTEM

(71) Applicant: Guangzhou Haoyang Electronic Co., Ltd., Guangzhou (CN)

(72) Inventors: Yingru Peng, Guangzhou (CN); Weikai Jiang, Guangzhou (CN); Zhiguang Liang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 106 days.

(21) Appl. No.: 18/523,027

(22) Filed: Nov. 29, 2023

(65) Prior Publication Data

US 2024/0219010 A1   Jul. 4, 2024

(30) Foreign Application Priority Data

Dec. 30, 2022 (CN) .......................... 202211722924.3

(51) Int. Cl.
*H05B 47/10* (2020.01)
*F21V 21/15* (2006.01)
*F21W 131/406* (2006.01)

(52) U.S. Cl.
CPC ....... *F21V 21/15* (2013.01); *F21W 2131/406* (2013.01)

(58) Field of Classification Search
CPC .... H05B 47/17; H05B 47/115; H05B 47/125; G06V 10/44; G06V 10/82; G06V 21/15; F21W 2131/406; Y02B 20/40

See application file for complete search history.

(56) References Cited

U.S. PATENT DOCUMENTS

| | | | |
|---|---|---|---|
| 11,382,201 B2 * | 7/2022 | Alfier | H05B 47/105 |
| 2012/0074296 A1 | 3/2012 | Hammes et al. | |
| 2017/0116462 A1 * | 4/2017 | Ogasawara | G01B 11/2513 |
| 2017/0347073 A1 * | 11/2017 | Shimizu | G06F 3/0425 |
| 2019/0192710 A1 | 6/2019 | Andersson et al. | |
| 2020/0377007 A1 * | 12/2020 | Fujiyama | H05B 45/20 |
| 2021/0127472 A1 | 4/2021 | Alfier et al. | |

FOREIGN PATENT DOCUMENTS

| | | |
|---|---|---|
| CN | 110397869 A | 11/2019 |
| CN | 110418462 A | 11/2019 |
| CN | 111435973 A | 7/2020 |
| CN | 111948891 A | 11/2020 |

* cited by examiner

*Primary Examiner* — Tung X Le

(74) *Attorney, Agent, or Firm* — MUNCY, GEISSLER, OLDS & LOWE, P.C.

(57) ABSTRACT

A lighting control method includes steps of: obtaining an influence range of lighting irradiation of a light source; recognizing a plurality of designated targets within a certain range; making a marking for each of the designated targets and obtaining a current distance between each of the designated targets and the light source; obtaining a current output power of the light source; and determining whether the marking enters the influence range, whether the current distance is less than a preset distance threshold, and whether the output power is greater than a preset power threshold, if all yes, outputting a protection signal. According to the present invention, safety can be visually and quickly determined in an easy way through three conditions including the influence range, the current distance and the output power, without complex energy density calculation.

17 Claims, 4 Drawing Sheets

LIGHTING CONTROL METHOD AND SYSTEM

CROSS REFERENCE TO RELATED APPLICATIONS

The present application claims priorities from Chinese Application No. CN 202211722924.3 filed on Dec. 30, 2022, all of which are hereby incorporated herein by reference.

TECHNICAL FIELD

The present invention relates to the technical field of lighting control, in particular to a lighting control method and system.

BACKGROUND

Lighting irradiation is widely used, especially in stage. Lighting can create various atmospheres and good lighting atmosphere can particularly enhance and highlight certain scene, thereby attracting the audience's attention and creating resonance. In order to achieve diversity of lighting, different combined effects are generally needed. In particular, high-quality stage lighting usually requires effective combinations of lighting regarding power, types, effects, and precise programming and control to achieve optimum lighting effect. Excellent stage lighting can present desired scenes on the stage without reservation, for example, static scenes or dynamic scenes can be created by colorful lighting effects and color combinations, as well as lighting effects from equipment such as beam lights, moving head lights, and laser lights. Moreover, different color combinations and design schemes can create different atmospheres and showcase the beauty of the stage.

Such lighting applications obviously have gone beyond traditional lighting, high-power lighting thus is generally used for flexible effects and versatility in various scenarios. However, high-power output light usually generates high-intensity light beams, which can easily cause burns when irradiating human bodies, especially irradiating the eyes, eye damage will be caused in a very short period. Even only irradiating surfaces of objects, temperature of the surface will get rise, potentially leading to fires for flammable objects. Regarding lighting combination, in addition to the high-power light, laser light sources are usually provided as well. Whether it is a high-power light source or a laser light source, high-power irradiation is inevitable to generate lighting effects in large stages.

Therefore, it is required to properly regulate lighting to ensure safety of humans and other objects within the irradiating area and eliminate potential safety hazards. There are various safety protection measurements, however, such existed measurements are usually complex in calculation and slow in response speed.

SUMMARY OF THE INVENTION

It is therefore an object of the present invention to provide a lighting control method and system, which can provide more safe lighting irradiating environment when use.

The lighting control method according to the present invention, includes steps of: obtaining an influence range of lighting irradiation of a light source; recognizing a plurality of designated targets within a certain range; making a marking for each of the designated targets and obtaining a current distance between the designated target and the light source; obtaining a current output power of the light source; and determining whether the marking enters the influence range, whether the current distance is less than a preset distance threshold, and whether the output power is greater than a preset power threshold, if all yes, outputting a protection signal.

In the present invention, before obtaining the influence range of lighting, an operation state of the lighting irradiation is preferably obtained, such operation state including a dynamic illumination state and a static illumination state, a movement trajectory of the light source in the dynamic illumination state is then predicted based on an input lighting angle parameter, and it is determined whether the marking enters the influence range by analyzing whether the movement trajectory avoids the marking.

In particular, the method of obtaining the influence range of lighting irradiation includes acquiring a current image having a light spot along an irradiation direction of the light source by an image acquisition device arranged close to the light source and movable with the light source; and separating a shape of the light spot from the current image and marking a boundary line of the light spot to obtain the influence range of lighting irradiation according to the boundary line marked.

Preferably, after marking the boundary line of the light spot, a theoretical shape of the light spot is obtained according to a beam shape of the light source and a shape of a light shielding component on a light path, and the boundary line is corrected according to the theoretical shape to eliminate an irregular part and/or a shielded part in the boundary line.

The method of marking each of the designated targets is particularly in a way that each of the designated targets is obtained from the current image by the target detection method based on neural network and the current distance and the current position are also obtained, then each designated target is framed in a matching size based on the current distance and the current position to form the marking corresponding to the designated target, the marking can change as the designated target changes.

More particularly, to form a frame for each designated target in a matching size based on the current distance and the current position, a relative position between the designated target and the boundary line is obtained to determine a position center of the frame, and a size of the frame is determined based on the distance between the designated target and the light source. Therefore, each designated target can be framed in a matching size according to the position center of the frame and the size of the frame.

According to the present invention, whether the marking enters the influence range is determined by whether there is an intersection between the frame and the boundary line; and whether the current distance is less than the preset distance threshold is determined based on change of the size of the frame.

Before recognizing the plurality of designated targets within the certain range, the lighting control method in the present invention further includes steps of: respectively inputting each of the plurality of designated targets to be recognized; inputting a plurality of multi-angle training images of the respective designated target; labeling features of the training images with category, size, and distance; and respectively performing training of neural network, based on the training images and the labels, for each of the plurality of designated targets. That is, training of neural network for each of the plurality of designated targets is performed in this step. In this case, the plurality of designated targets within the certain range is recognized by the neural network.

According to the present invention, a safe movement range of the light source can be further set. In this case, if the influence range of the light source is detected not within the safe movement range, a protect signal will be output.

After the protection signal output, a security strategy is executed according to the protection signal, the security strategy including reducing the output power and/or amplifying a projection angle.

The present invention further provides a lighting control system using the lighting control method described above, including a motor, a light source, a camera, a main controller, a motor controller, a light source controller, and a target detector.

In the present invention, the light source is configured to emit the lighting irradiation; the motor is configured to control the light source to rotate; the motor controller is configured to control the motor; and the light source controller is configured to control the light source and obtain the current output power of the light source.

The camera is configured to acquire the influence range of lighting irradiation of the light source and the plurality of designated targets within the certain range. The target detector is configured to make the marking for each of the designated targets and obtain the current distance between each of the designated targets and the light source, and further configured to send a first signal to a main controller when the marking enters the influence range, send a second signal to the main controller when the current distance is less than the preset distance threshold, and send a third signal to the main controller when the output power is greater than the preset power threshold; and wherein the main controller is configured to output the protection signal when simultaneously receiving the first signal, the second signal and the third signal.

Compared with the related art, the present invention directly shows specific information on each of the designated target in the detection process through marking, which facilitates rapid batch removal and batch extraction in the case of a large number of designated targets to be tracked, thereby reducing calculation difficulty. In addition, in the case of complex lighting irradiation, the safety of the system can be visually and quickly determined in an easy way through three conditions including the influence range, the current distance and the output power, without complex energy density calculation, which thus provides a new idea for reducing influence of the light source on the designated targets.

DETAILED DESCRIPTION

Figure 1:
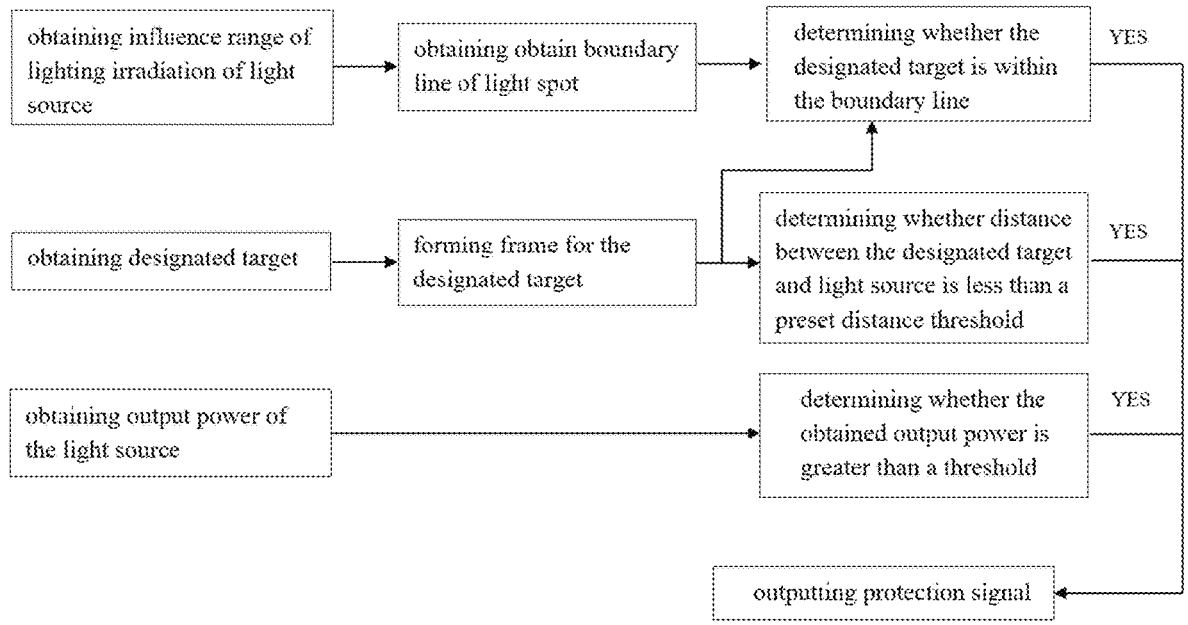
FIG. 1 is a flowchart of a control method according to an embodiment of the present invention.

The accompanying drawings are for exemplary illustration only, and should not be construed as limitations on the present invention; to better illustrate the embodiments below, certain parts in the accompanying drawings may be omitted, enlarged or reduced in size, and they do not represent the size of an actual product; for those skilled in the art, it is understandable that certain well-known structures and descriptions thereof in the drawings may be omitted.

FIG. 1 illustrates a lighting control method according to an embodiment of the present invention, including steps of: obtaining an influence range of lighting irradiation of a light source; recognizing a plurality of designated targets within a certain range; making a marking for each of the designated targets and obtaining a current distance between the designated target and the light source; obtaining a current output power of the light source; and determining whether the designated target enters the influence range, whether the current distance is less than a preset distance threshold, and whether the output power is greater than a preset power threshold, if all yes, outputting a protection signal.

The lighting irradiation is particularly generated by high-power lights or laser lights. The influence range of lighting irradiation particularly refers to an area illuminated by the light source during illumination. In the present embodiment, the plurality of designated targets within a certain range can be quickly obtained by capturing images and analyzing the images by a neural network. Examples of the designated target include a flammable object that may generate heat and burn, a human or another organism that may be damaged, or a reflector that causes irregular divergence of lighting and thus leads to out of control of high-power lighting when suffering lighting irradiation of the light source. An area for obtaining the designated target is not less than the illuminated area of the light source in the present embodiment. Each designated target within a range monitored by the neural network needs to be individually made information marking. The marking records distance information on the designated target, and is variable with the designated target changes.

Due to regular variations in the distance information and images, the neural network can quickly update marking information. The protection signal is used to trigger a protective mechanism of lighting to ensure protection for other targets during illumination. According to the present embodiment, the protection signal will be triggered once simultaneously meeting three conditions. The first is the making entering the influence range of lighting irradiation, the influence range generally refers to a light spot; The second is the distance between the designated target and the light source being less than a preset safety threshold, such distance is usually recognized by the neural network; and the third is the output power of the current light source being less than a preset safety threshold, the output power herein refers to the output power set in the light source in a preset program rather than the actual power of the light source.

Before obtaining the influence range of lighting irradiation, the lighting control method further includes steps of: obtaining an operation state of the lighting irradiation, such operation state including a dynamic illumination state and a static illumination state; then predicting a movement trajectory of the light source in dynamic illumination state based on an input lighting angle parameter; and determining whether the marking enters the influence range by analyzing whether the movement trajectory avoids the marking.

The operation state is preset for the light source, indicating an upcoming state of lighting. The operation state of the light source generally includes a dynamic illumination state and a static illumination state. However, it is common for a combination of both, which includes a dynamic illumination process and a static illumination process. The movement trajectory of the light source presents in the dynamic illumination process, so that illumination safety of the light source can be more accurately controlled and evaluated by analyzing the movement trajectory. Since the speed in the movement process is uncertain, sometimes fast and sometimes slow, it is not required to first determine a light spot and then determine whether the target enters the influence range of the light spot in the dynamic illumination process as in the static illumination process, but pre-determine whether the designated target would fall within the influence range according to the movement trajectory of the lighting, thereby compensating in the situation that it is difficult to determine whether the designated target would fall within the influence range during movement of the light source.

The method for obtaining the influence range of lighting includes acquiring a current image having a light spot along an irradiation direction of the light source by an image acquisition device arranged close to the light source and movable with the light source, and separating a shape of the light spot from the current image and marking a boundary line of the light spot to obtain the influence range of lighting according to the boundary line marked.

Although the image acquisition device is arranged close to the light source, the image acquisition device can be actually arranged close to the light head in which the light source is arranged. The image acquisition device is generally a camera which is arranged at the light head consistent with the projection direction. In such situation, the light spot and the designated target are from the same image and thus are obviously comparable without any relative position analysis. This meets the requirement of quickly determining the distance between the light spot and the designated target in real-time detection, thereby simplifying the analysis and quickly determining whether to output the protection signal and execute the security strategy. The recognition of light spot may use image segmentation technology with segmentation algorithms including but not limited to a brightness threshold segmentation algorithm, an edge detection segmentation algorithm, and a deep learning segmentation algorithm. In practice, a laser beam is not directly used as the lighting, but forms a white light emitting surface after passing through a filter and an excitation material and then projects through an imaging lens to form a white round light spot. In this situation, the position and the acquisition direction of the image acquisition device is further limited, which can reduce the size of the image, decrease the amount of analysis and calculation required, and thus increase the accuracy and effectiveness of the image with less useless image parts, thereby implementing accurate acquisition and efficient analysis.

After marking the boundary line of the light spot, the lighting control method may further include steps of: obtaining a theoretical shape of the light spot according to a beam shape of the light source and a shape of a light shielding component on a light path; and correcting the boundary line according to the theoretical shape to eliminate an irregular part and/or a shielded part in the boundary line.

In actual use, the light spot is prone to being shielded by the designated target or objects other than the designated target, or the boundary line of the light spot is locally blurred or irregular due to the lens in the optical path. The incomplete or irregular boundary often poses obstacles to the determination of the designated target, so it is of practical significance to supplement the boundary line through correction. Therefore, the correction of the boundary line helps eliminate problems caused by inaccurate analysis and light interference caused by shielding, making the determination process more accurate.

The method of marking each of the designated targets includes obtaining the designated targets from the current image by target detection method based on neural network and obtaining the current distance and a current position of each designated target, and forming a frame for each designated target in a matching size according to the current distance and the current position and forming the marking corresponding to the designated target after forming the frame, the marking being configured to change as the designated target changes.

Framing can accurately reflect the position of the designated target, and further reflects the distance between the designated target and the light source by the size of the framing, thus achieving a concise analysis interface. In this situation, the concise framing display comprehensively intuitively reflects the relative relationship between the designated target and the light source, which is convenient for monitoring. The size of the frame reflects the distance and is consistent with the distance change rule in the image, the frame and the image thus have obvious commonality, thereby facilitating the neural network to estimate more accurately and with smaller errors.

In order to frame the designated target in the matching size according to the current distance and the current position, a relative position between the designated target and the boundary line is obtained and a position center of the frame is determined, a size of the frame thus is determined based on the distance between the designated target and the light source. Therefore, the frame is formed according to the position center of the frame and the size of the frame.

In the present embodiment, whether the marking enters the influence range is determined based on whether there is an intersection between the frame and the boundary line, and whether the current distance is less than the preset distance threshold is determined based on change of the size of the frame.

Before recognizing the plurality of designated targets within the certain range, the lighting control method further includes the steps of: respectively inputting each of the plurality of designated targets to be recognized; inputting a plurality of multi-angle training images of the respective designated target; labeling features of the training images with category, size, and distance; and respectively performing training of neural network, based on the training images and the labels, for each of the plurality of designated targets. That is, training of neural network for each of the plurality of designated targets is performed in this step. In this situation, the plurality of designated targets within the certain range is recognized by the neural network.

Specifically, the target detection and the distance detection may be a target detection based on a deep learning neural network, and detection algorithms include but are not limited to SSD and Yolo. The flammable object may refer to a curtain, a sofa, a seat and the like.

In the present embodiment, a safe movement range of the light source may be set in the lighting control method. In this situation, the protection signal will be output if the influence range of the light source is not within the safe movement range.

In the actual use of lighting, for example, the projection direction of the light beam of the stage light is generally limited to the stage, the stage area is thus set as the safe movement range, which is restricted by a rotation range of a light head. It is necessary to ensure that the light source would not project onto the audience area or cameras used for stage recording. It is also required that when the stage light is turned towards the audience area or the cameras, a protection signal will be triggered. This is unrelated to the designated target but is related to the movement of the light source. Therefore, the safe movement range forms an additional and independent redundant protection mechanism, further enhancing safety of the overall system during use.

The lighting control method further includes executing a security strategy according to the protection signal after the protection signal output, the security strategy mainly includes reducing the output power and/or amplifying a projection angle.

Figure 2:
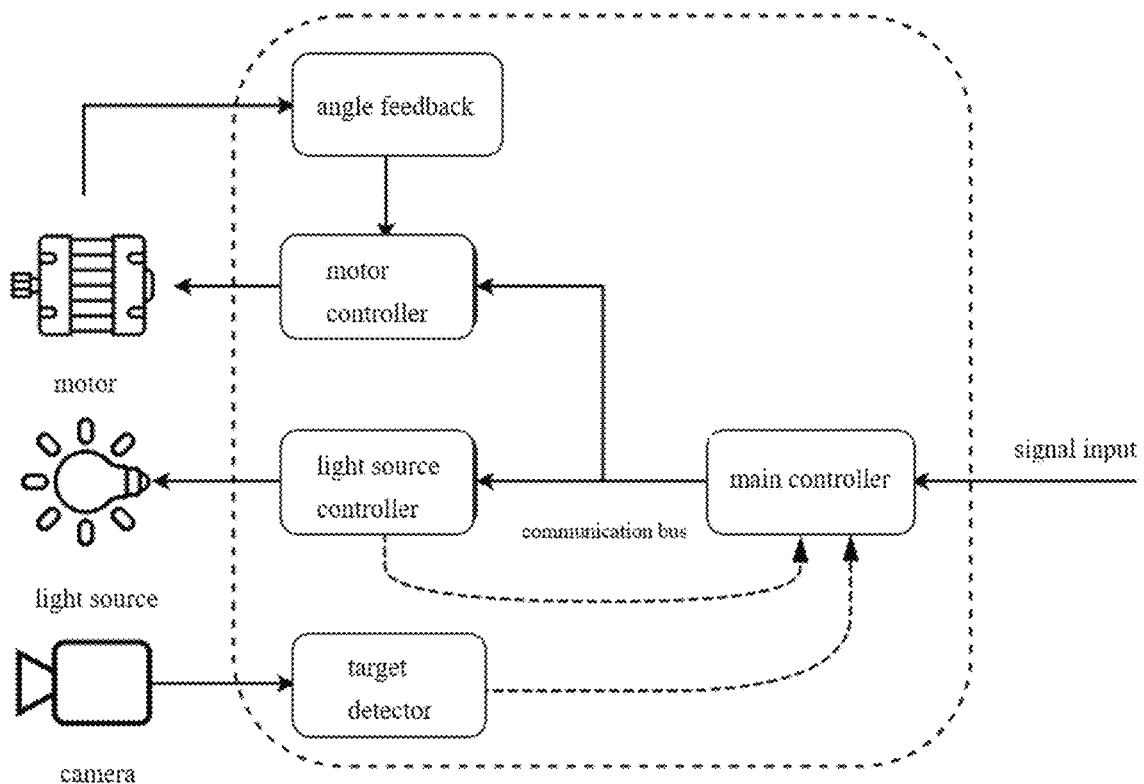
FIG. 2 is a schematic diagram of a control system according to an embodiment of the present invention.
Figure 4:
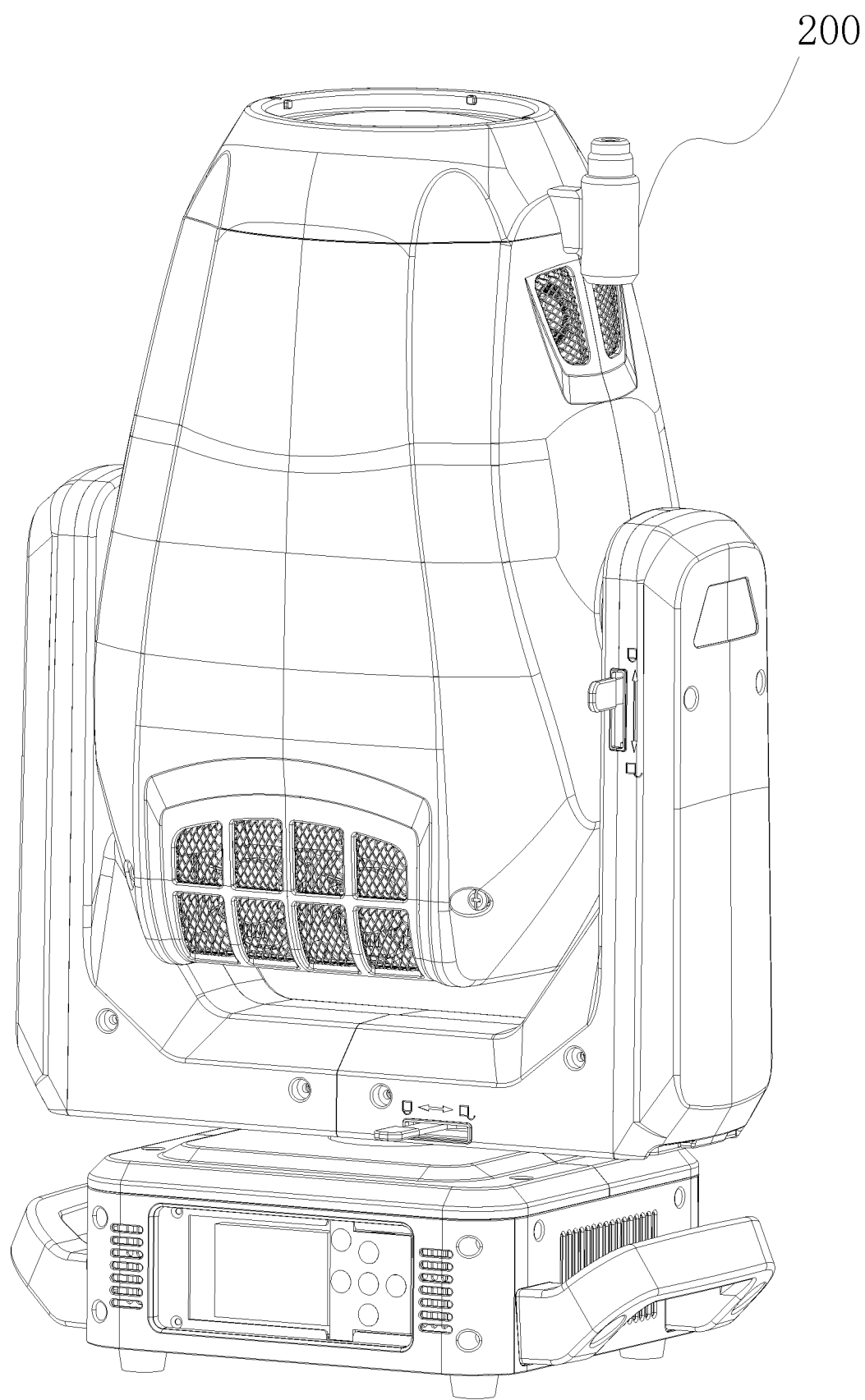
FIG. 4 is a perspective view of a lighting control system according to an embodiment of the present invention.
Figure 5:
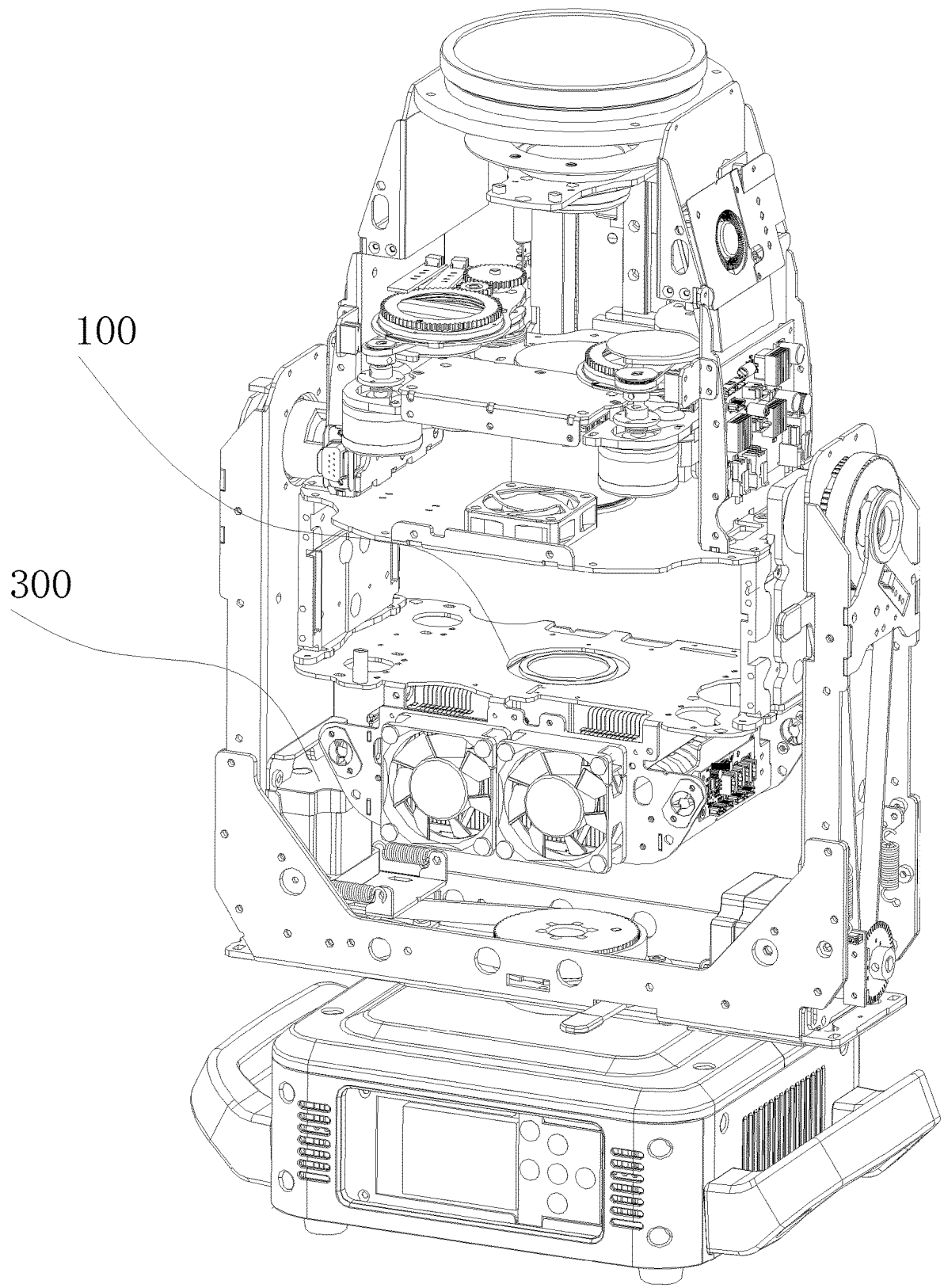
FIG. 5 is a schematic view showing inside of the lighting control system of FIG. 4.

As shown in FIGS. 2, 4 and 5, a lighting control system using the method described above is provided according to an embodiment of the present invention, which includes a motor 300, a light source 100, a camera 200, a main controller, a motor controller, a light source controller, and a target detector. The motor 300 is configured to control rotation of the light source 100. The camera 200 is installed at the light head of the light source 100 and is configured to capture a light spot and detect a designated target. The main controller is configured to receive an input signal from a console to control the power and movement of the light source 100. The motor controller is configured to control the motor 300. The light source controller is configured to control the power and other variations of the light source. The target detector is configured to analyze the image of the camera 200 and detect the designated target. The lighting control method mentioned above is stored in the main controller and executed by the main controller.

Before use, it is necessary to perform neural network deep learning on the camera 200 and the target detector through pre-captured photographs and information input such as position, size, category, and distance of objects. This enables accurate recognition of the type and distance of the object when encountered later in the workflow. In actual, targets requiring avoidance, such as humans and flammable objects, are designated and then captured by the camera from a plurality of angles. Each of the photographs captured by the camera is labeled with information such as position, size, category, and distance. After recognizing these targets, the target detector undergoes repeated neural network training until a loss function of predicted values and training values is less than a target threshold, showing the training deployment is completed.

In actual use, the main controller first obtains the operation state of lighting and confirms the subsequent operation state of the light source 100. If the light source 100 is to be in a moving state, the target detector predicts the movement trajectory of the light source 100 in the dynamic illumination process through an input light illumination angle parameter; and whether the designated target enters the influence range is determined by analyzing whether the movement trajectory avoids the current marking of the designated target. If the light source 100 is to be in a stationary state, a current image having a light spot is obtained by the camera 200 along the irradiation direction of the light source 100; the target detector separates a shape of the light spot from the current image, and marks a boundary line of the light spot to obtain the influence range of lighting.

Figure 3:
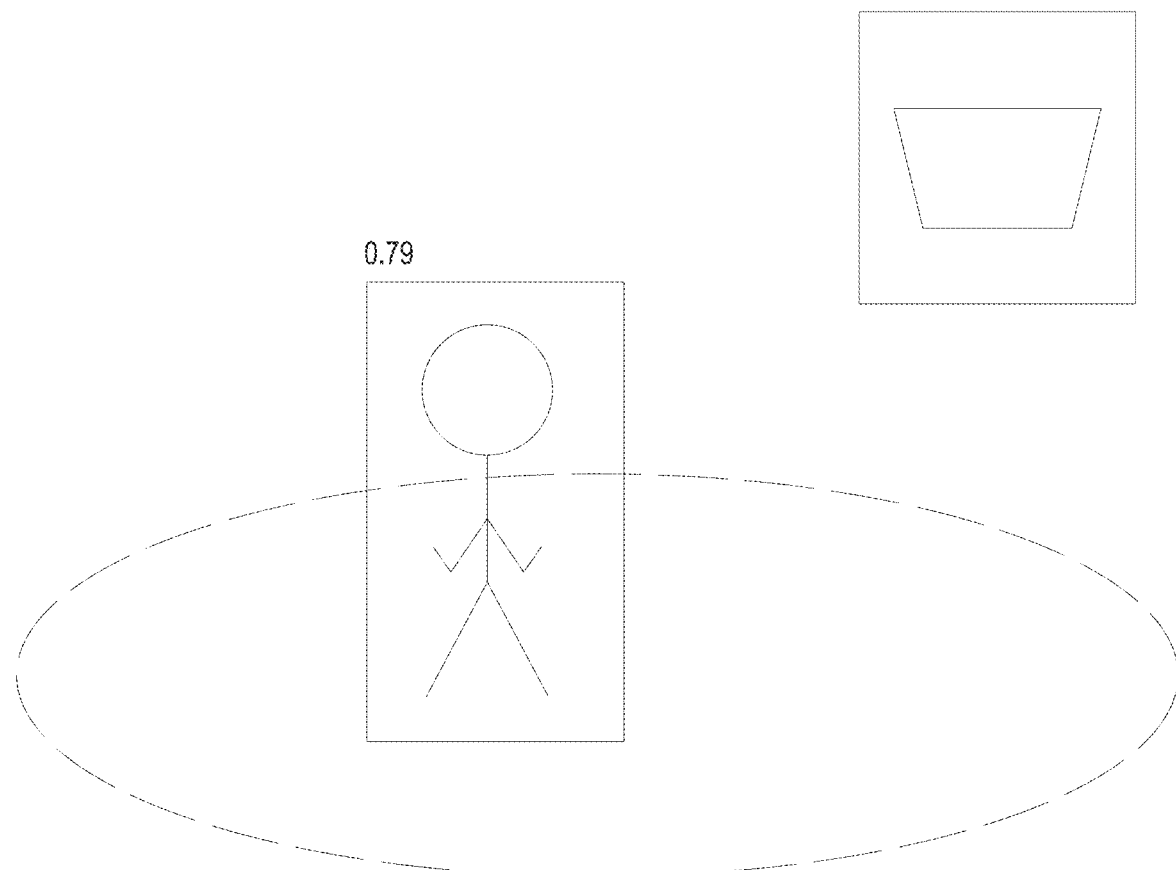
FIG. 3 is a schematic diagram showing framing on-site and a boundary line of a light spot according to an embodiment of the present invention.

After marking the boundary line of the light spot, the target detector obtains a theoretical shape of the light spot according to a beam shape of the light source 100 and a shape of a light shielding component on the light path; then the boundary line is corrected according to the theoretical shape, and an irregular part and a shielded part in the boundary line are eliminated to obtain a regular and complete boundary line and determine the influence range of lighting, as shown in FIG. 3, an ellipse in a dotted line is formed as the influence range. The target detector collects designated targets within a certain range by the camera 200 and marks each of the designated targets according to an actual state such as a distance and a size of the designated target. Specifically, the target detector obtains the designated target from a current image by target detection method based on neural network and obtains a current distance and a current position, then the designated target is framed in a matching size according to the current distance and the current position to form a marking corresponding to the designated target after framing, the marking being configured to change as the designated target changes.

In order to frame the designated target in a matching size according to the current distance and the current position, the target detector obtains a relative position between the designated target and the boundary line and determines a position center of the framing, the target detector then determines the size of the framing according to the distance between the designated target and the light source 100, and the framing is formed according to the position center of the framing and the size of the framing to form a frame-shaped marking, as shown in FIG. 3, the framing may be a marking of human or object. In addition to outputting a protection signal through the above determination, the light source 100 is also set a safe movement range, so that a protection signal can also be output by determining whether the influence range of the light source 100 is within the safe movement range. Especially, the protection signal will be output if the light source 100 moves beyond the safe movement range.

The safe movement range is set by the motor controller, and is distinguished by detecting and controlling rotation range of the light head of the light source 100. When the motor controller detects that the light head enters an unsafe range, the motor controller sends a protection signal to the main controller.

Obviously, the above-mentioned embodiments of the present invention are only examples for clearly illustrating the technical solutions of the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

What is claimed is:

1. A lighting control method, comprising steps of:
   obtaining an influence range of a lighting irradiation of a light source;
   recognizing a plurality of designated targets within a certain range;
   making a marking for each of the designated targets and obtaining a current distance between each of the designated targets and the light source;
   obtaining a current output power of the light source; and
   determining whether the marking enters the influence range, if yes, sending a first signal;
   determining whether the current distance of the corresponding designated target is less than a preset distance threshold, if yes, sending a second signal;

determining whether the current output power of the light source is greater than a preset power threshold, if yes, sending a third signal; and outputting a protection signal, in response to simultaneously receiving the first signal, the second signal, and the third signal.

2. The lighting control method according to claim 1, wherein before obtaining the influence range of lighting irradiation, further comprising steps of:

obtaining an operation state of lighting, the operation state including a dynamic illumination state and a static illumination state;

predicting a movement trajectory of the light source in the dynamic illumination state based on an input lighting angle parameter; and determining whether the marking enters the influence range by analyzing whether the movement trajectory avoids the marking.

3. The lighting control method according to claim 1, wherein the step of obtaining the influence range of lighting irradiation includes:

acquiring a current image having a light spot along an irradiation direction of the light source by an image acquisition device arranged close to the light source and movable with the light source;

separating a shape of the light spot from the current image and marking a boundary line of the light spot to obtain the influence range of lighting irradiation.

4. The lighting control method according to claim 3, after marking the boundary line of the light spot, further comprising steps of:

obtaining a theoretical shape of the light spot according to a beam shape of the light source and a shape of a light shielding component on a light path; and correcting the boundary line according to the theoretical shape to eliminate an irregular part and/or a shielded part in the boundary line.

5. The lighting control method according to claim 1, wherein the step of marking each of the designated targets includes:

obtaining each of the designated targets from a current image by a target detection method based on neural network and obtaining the current distance and a current position;

forming a frame for each of the designated targets in a matching size based on the current distance and the current position to form the marking corresponding to each of the designated targets, wherein the marking is variable with the respective designated target changes.

6. The lighting control method according to claim 5, wherein whether the marking enters the influence range is determined based on whether there is an intersection between the frame and the boundary line; and whether the current distance is less than the preset distance threshold is determined based on change of a size of the frame.

7. The lighting control method according to claim 1, wherein before recognizing the plurality of designated targets within the certain range, the lighting control method further comprises steps of:

respectively inputting each of the plurality of designated targets to be recognized;

inputting a plurality of multi-angle training images of the respective designated target;

labeling features of the training images with category, size, and distance; and respectively performing training of neural network, based on the training images and the labels, for each of the plurality of designated targets, and wherein the plurality of designated targets within the certain range is recognized by the neural network.

8. The lighting control method according to claim 1, further comprising the steps of:

setting a safe movement range of the light source;

detecting whether the influence range of lighting irradiation is within the safe movement range; and outputting the protection signal if the influence range of lighting irradiation is not within the safe movement range.

9. The lighting control method according to claim 1, wherein in response to the protection signal, a security strategy is executed according to the protection signal, the security strategy including at least one of reducing the output power and amplifying a projection angle.

10. A lighting control system, comprising:

a light source, configured to emit alighting irradiation;

a motor, configured to control the light source to rotate;

a motor controller, configured to control the motor;

a light source controller, configured to control the light source and obtain a current output power of the light source;

a camera, configured to acquire an influence range of the lighting irradiation and a plurality of designated targets within a certain range;

a target detector, configured to make a marking for each of the designated targets and obtain a current distance between each of the designated targets and the light source and further configured to send a first signal to a main controller when the marking enters the influence range, send a second signal to the main controller when the corresponding current distance is less than a preset distance threshold, and send a third signal to the main controller when the current output power of the light source is greater than a preset power threshold; and wherein the main controller is configured to output a protection signal when simultaneously receiving the first signal, the second signal and the third signal.

11. The lighting control system according to claim 10, wherein the main control is configured to obtain an operation state of the lighting irradiation, the operation state including a dynamic illumination state and a static illumination state, the target detector is further configured to predict a movement trajectory of the light source in the dynamic illumination state based on an input lighting angle parameter and determine whether the marking enters the influence range by analyzing whether the movement trajectory avoids the marking.

12. The lighting control system according to claim 11, wherein the camera is further configured to acquire a current image having a light spot along an irradiation direction of the light source in the static illumination state, and the target detector is further configured to separate a shape of the light spot from the current image and mark a boundary line of the light spot to obtain the influence range of lighting irradiation.

13. The lighting control system according to claim 12, wherein the target detector is further configured to obtain a theoretical shape of the light spot according to a beam shape of the light source and a shape of a light shielding component on a light path; and correct the boundary line according to the theoretical shape to eliminate an irregular part and/or a shielded part in the boundary line.

14. The lighting control system according to claim 12, wherein the target detector is further configured to obtain each of the designated targets from the current image based on neural network and obtain the current distance and a current position, and form a frame for each of the designated targets in a matching size based on the current distance and the current position to form the marking corresponding to each of the designated targets, wherein the marking is variable with the respective designated target changes.

15. The lighting control system according to claim 14, wherein the target detector is configured to obtain a relative position between each of the designated targets and the boundary line and determine a position center of the frame, determine the size of the frame according to the distance between the corresponding designated target and the light source, and form the frame according to the position center of the frame and the size of the frame to form the frame-shaped marking.

16. The lighting control system according to claim 10, wherein the motor controller is configured to set a safe movement range for the light source and output the protection signal if the influence range of lighting irradiation is not within the safe movement range.

17. The lighting control system according to claim 10, wherein the light source controller is further configured to conduct a security strategy according to the protection signal, the security strategy including at least one of reducing the output power and amplifying a projection angle of the light source.

* * * * *